US005088783A

United States Patent [19]

Squires

[11] Patent Number: 5,088,783

[45] Date of Patent: Feb. 18, 1992

[54] LOAD HANDLING APPARATUS

[76] Inventor: Michael Squires, Weathertrees, Gretton Road, Harringworth, Corby Norhtants NN17, Great Britain

[21] Appl. No.: 599,857

[22] Filed: Oct. 19, 1990

[30] Foreign Application Priority Data

Oct. 27, 1989 [GB] United Kingdom ................ 8924222

[51] Int. Cl.[5] ........................................ B65G 57/03

[52] U.S. Cl. ........................ 294/81.54; 294/81.51; 294/81.55; 294/88; 414/626; 414/785

[58] Field of Search .............. 414/399, 416, 422, 424, 414/618, 622, 626, 672, 785; 294/82.35, 88, 119.1, 119, 67.33, 81.54, 81.62, 67.4, 81.51, 81.55; 108/56.1, 56.3

[56] References Cited

U.S. PATENT DOCUMENTS

| | | | |
|---|---|---|---|
| 2,642,307 | 6/1953 | Olson | 294/119.1 X |
| 2,665,937 | 1/1954 | Reigh | 294/81.54 |
| 3,076,073 | 2/1963 | Kaplan et al. | 414/626 X |
| 3,522,896 | 8/1970 | Newton | 414/622 X |
| 4,592,692 | 6/1986 | Suiza et al. | 414/626 X |

FOREIGN PATENT DOCUMENTS

| | | | |
|---|---|---|---|
| 1197948 | 12/1985 | U.S.S.R. | 414/424 |
| 1556369 | 11/1979 | United Kingdom | 294/88 |

*Primary Examiner*—Frank E. Werner
*Assistant Examiner*—James Keenan
*Attorney, Agent, or Firm*—Longacre & White

[57] ABSTRACT

A suspension frame for raising or lowering by a crane or hoist carries an assembly of depending limbs or legs which are power operated by a ram for extension apart or retraction and when retracted have a detachable hook engagement with load bearing portions of a split pallet assembly. On extension of the legs the pallet portions are withdrawn apart from under the load in order to deposit it on the ground after which the separated pallet portions are raised clear of the load. An assembly of load holding or steadying plates also depend from the suspension structure and are power operated by a ram against the load to hold or steady the latter during withdrawal of the pallet portions from under the load and its deposit on the ground or other surface, on or after which the plates are released from the load.

14 Claims, 8 Drawing Sheets

1
2
3
5
8
10
11
12
13
15
15'
20
22
23
24
25
30
31
33
50
51
52
52'
53
54
54'
55

VIII
IX
40
41
42
43
44

LOAD HANDLING APPARATUS

BACKGROUND OF THE INVENTION

The object of this invention is to provide improved apparatus in the nature of a grab for handling a wide variety of loads in a palletised manner such as bricks, blocks, tiles and other building materials as well as turf and sacks of materials to name but a few typical examples.

Although the usual fork lift truck handled wooden pallet is a low cost item it has a short serviceable life or is quite often not returned, so that considerable financial outlay is involved where large quantities of such pallets are employed.

A particular object of this invention is to avoid or minimise such disadvantage and provide for effective, economic and convenient pallet handling of various kinds of loads. These and other practical advantages will be apparent from the following disclosure.

SUMMARY OF THE INVENTION

According to the present invention there is provided load handling apparatus comprising an assembly of opposed limbs or like structures which depend from a suspension structure which latter is adapted to be raised or lowered by a crane, hoist or the like. The opposed limbs or the like are arranged to be power operated from the suspension structure for lateral extension apart or retraction towards one another and adapted, when so retracted, to detachably engage at their lower ends load bearing portions of a divisible or split pallet assembly when said portions are closed together. This enables lifting and lowering of said closed pallet assembly to take place in a load supporting condition with the suspension structure. On the other hand, lateral extension apart of the opposed limbs or the like effects withdrawal of the pallet portions apart from under a load thereon in order to deposit the load on the ground or other surface and whereby the withdrawn and separated pallet portions can be subsequently lifted or otherwise moved clear of the deposited load.

The invention is further characterised by gripping or locating means which also depends from the support structure and is arranged to be operated against a load on the pallet assembly to hold or steady the load thereon during withdrawal of the pallet portions from under the load, said means being further operable to release the load, on or after its deposit from the withdrawn pallet portions.

A further aspect of the invention is the provision of operating means on the support structure such as fluid pressure operated (e.g. hydraulic) ram means arranged to operate the pallet engaging limbs or the like and the gripping or locating means in conjunction with one another in handling the pallet assembly and in holding or steadying the load during withdrawal of the pallet portions from under the latter.

Another aspect of the invention is the provision of valve means for the sequential and changeover control of the operating or ram means in obtaining the required operating procedure of the limbs or the like and the gripping or locating means.

DESCRIPTION OF THE DRAWINGS

A practical example of the apparatus and its method of operation is shown in the accompanying drawings.

DETAILED DESCRIPTION

Figures 4, 5, 6:
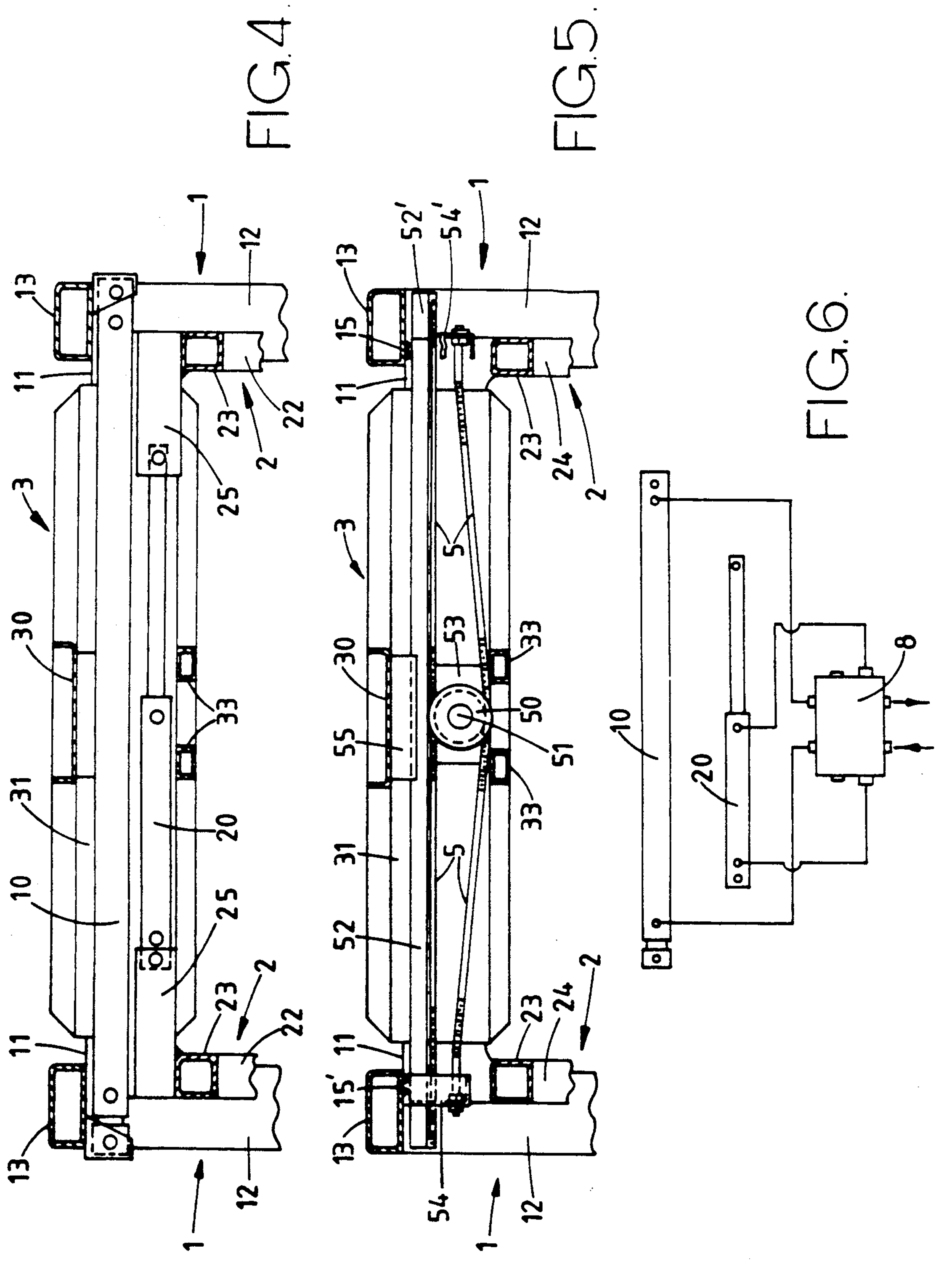
FIGS. 4 and 5 are detail cross sectional views taken on the lines IV—IV and V—V of FIG. 3 respectively.
FIG. 6 is a circuit diagram of the hydraulic operation of the apparatus.

For clarity hydraulic hose connections have been omitted from the drawings but will be apparent from the circuit diagram of FIG. 6.

Figure 1:
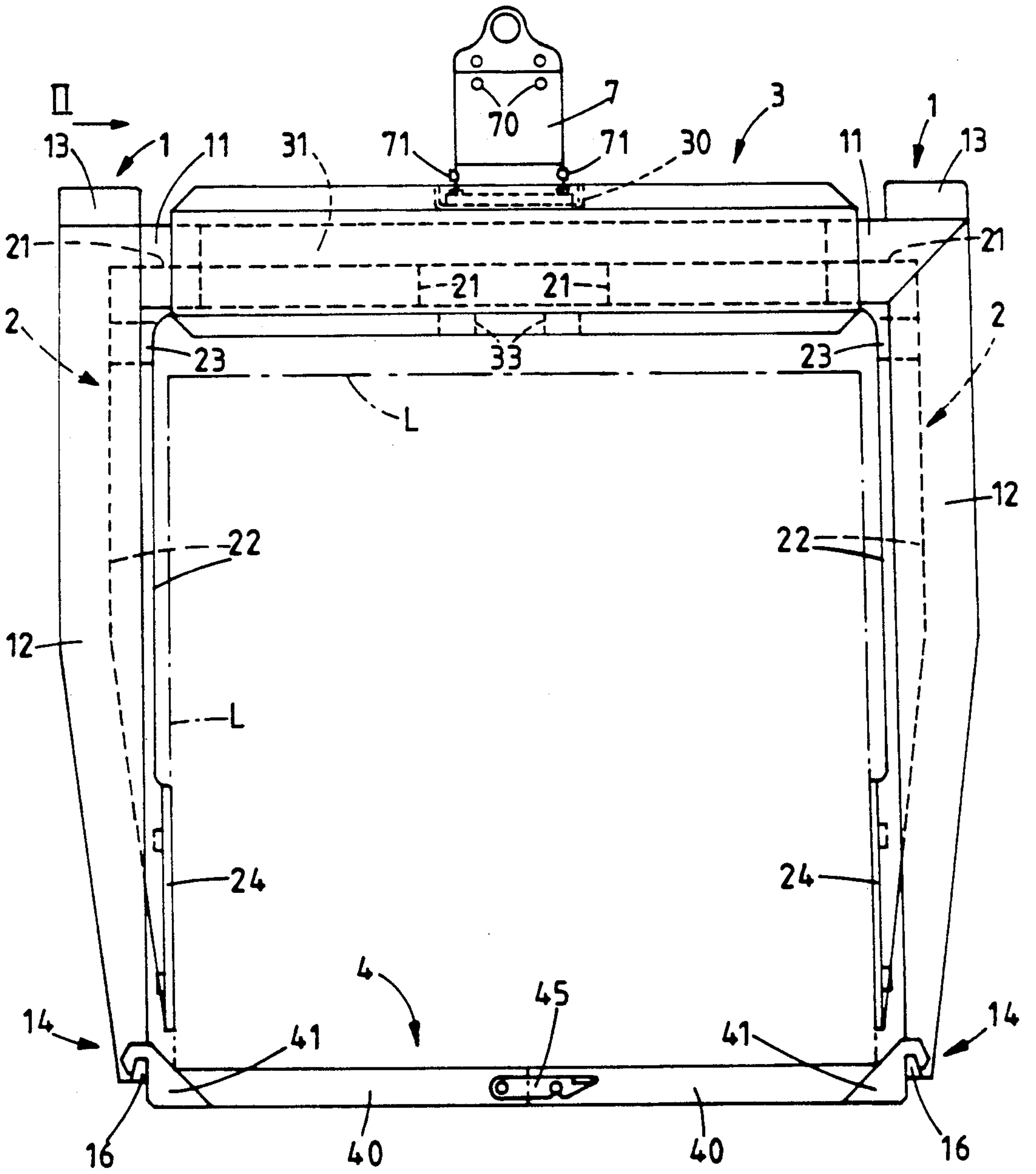
FIGS. 1, 2 and 3 are a front elevation, side view (in the direction of the arrow II of FIG. I) and plan view respectively.
Figure 2:
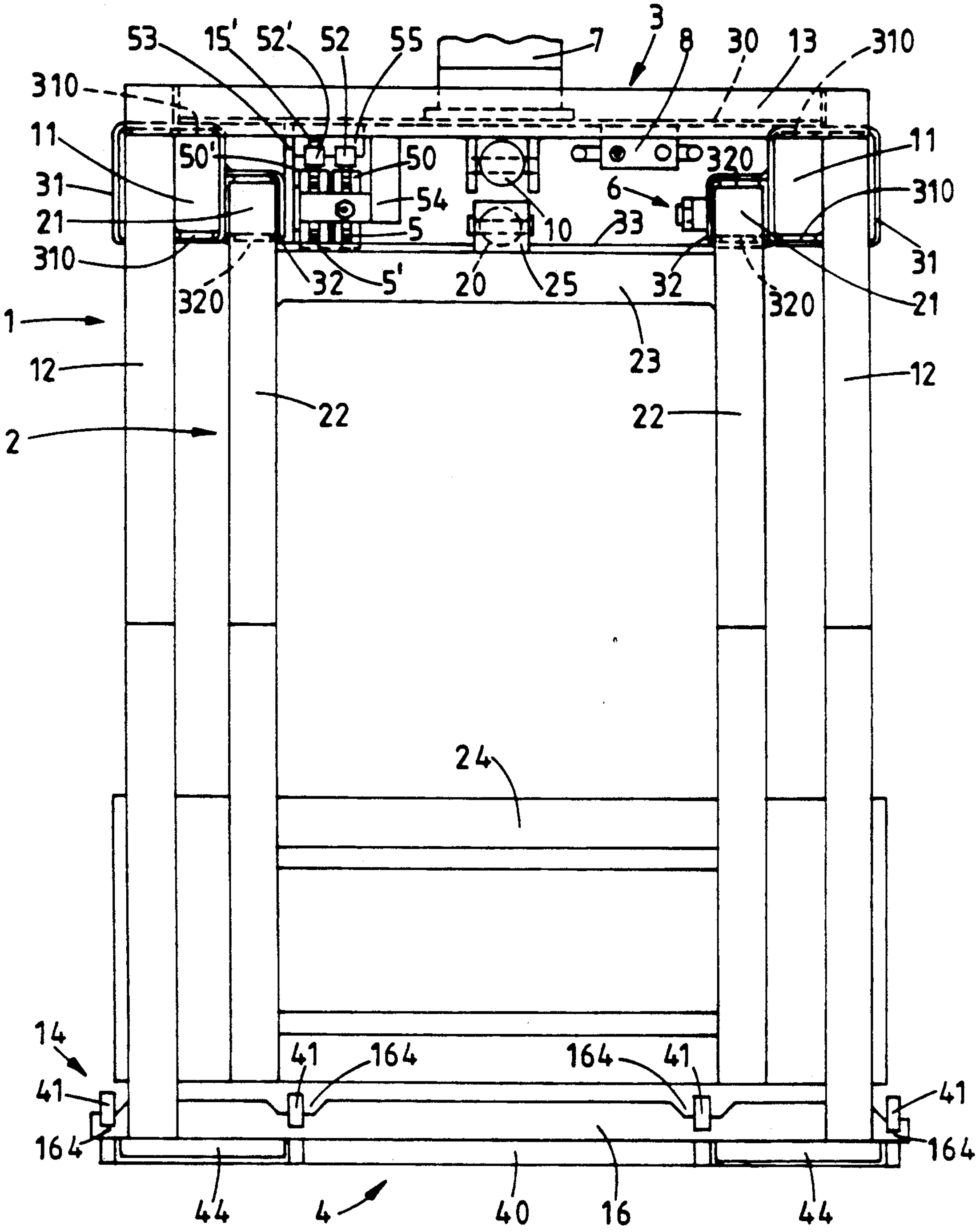
Figure 3:
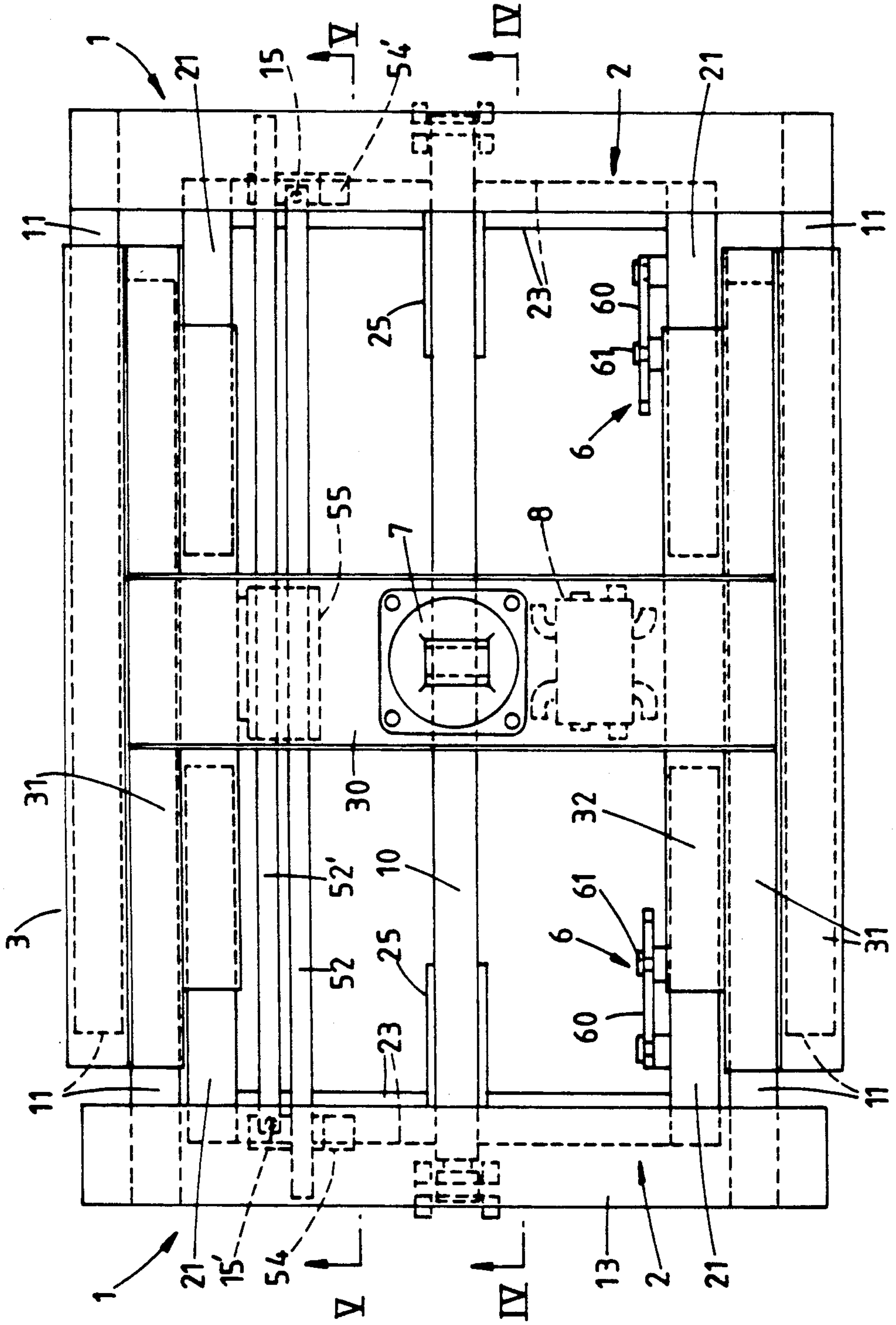

Referring to FIGS. 1 to 3 the load handling apparatus or grab generally comprises an outer pallet engaging assembly 1 and an inner load gripping or locating assembly 2 both depending from an upper suspension structure or frame 3 which latter consists of two pairs of outer and inner hollow rectangular and channel section guide members 31, 32 respectively, each pair of which is united in spaced apart relationship by an upper central shallow channel section cross beam 30 and a pair of lower central cross members 33.

The frame 3 carries at each side a pair of spaced apart depending limbs or legs 12 of the outer assembly 1 mounted for outward lateral extension apart from the frame 3 or inward retraction towards one another to the pallet engaging position as shown. For this purpose each leg 12 is provided with an arm 11 slidable in a corresponding outer hollow guide member 31 and each pair of legs 12 is united by an upper cross member 13 in appropriate spaced apart relationship, the cross members 13 being connected by a centrally positioned hydraulic or other fluid pressure operated ram 10 having a double action and suitable stroke for extending the cross members 13 and their legs 12 apart from the frame 3 or their retraction thereto.

Figures 7, 8, 9:
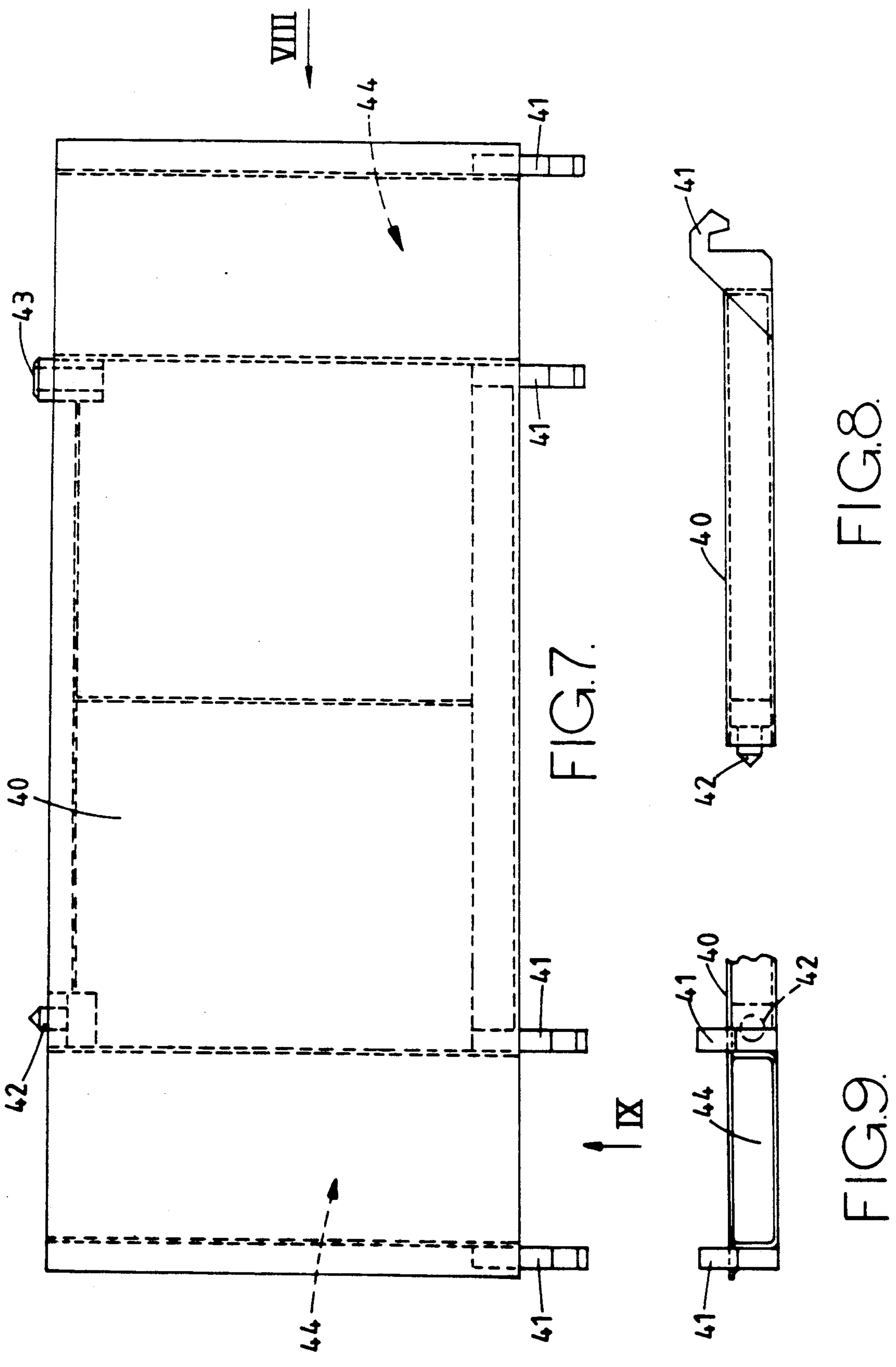
FIG. 7 is a plan view of a pallet half portion.
FIGS. 8 and 9 are detail side views taken in the direction of the arrows VIII and IX of FIG. 7 respectively.

For load support purposes the lower end of each pair of legs 12 detachably carries at its outer edge one half portion 40 of a divisible or split pallet assembly 4, the two half portions 40 having a locating engagement such as pin and socket location 42, 43 (FIGS. 7 to 9) at their adjacent inner edges in the close together load supporting condition shown in FIG. 1.

The lower ends of each pair of legs 12 are shown having a hook engagement 14 with the outer edge of its associated pallet half portion 40 which enables the pallet assembly 4 to be detached from the pairs of legs 12 when required during a load handling operation and as later described. The hook engagement 14 is shown provided by recesses 164 in a lower cross member 16 to the legs 12 detachably engaging hooked shaped brackets 41 carried by the corresponding outer edge of each pallet half portion 40. This hook arrangement 14 enables each pallet half portion 40 to assume a limited downwardly inclined position from its carrying legs 12 when the pallet portion 40 is laterally withdrawn from under a load L and is raised clear by upward movement of the frame 3. Such inclination action also facilitates the withdrawal of the pallet portions 40 and also their movement together on a suitable surface. Other arrangements of hook engagement and forms of pallet construction are later described.

Despite any above mentioned downward inclination, the extent of lateral extension movement of each pair of legs 12 is substantially equal to the width of a pallet half portion 40 and in view of this and to maintain adequate support of the legs 12 when fully extended, the arms 11 are required to be of sufficient length such that when the legs 12 are laterally retracted the arms 11 assume an overlapping relationship in their respective guide members 31 which are of suitable extent for the purpose, whilst the arms 11 of one pair of legs 12 are offset in relation to those of the other pair all as shown in FIG. 3.

For satisfactory operation the extension and retraction movement of the pairs of legs 12 relative to the frame 3 should be equalised and this is shown achieved in a known manner by a flexible member such as a sprocket chain 5 connected at 54 to the cross member 13 of one pair of legs 12 and, after passing partly about a peripherally grooved guide pulley 50 (or a sprocket) freely rotatably carried centrally by the frame 3, is connected to the free end of an arm 52 extending inwardly from the cross member 13 at 15 of the other pair of legs 12. Thus, for example, on extension movement of the left hand pair of legs 12 the chain 5 is pulled to impart corresponding right hand outward movement of the arm 52 and right hand pair of legs 12 with clockwise rotation of the pulley 50. For balanced operation in providing equalised extension and retraction movements the arrangement is repeated in an opposite manner by a further chain 51', co-axial pulley 50' and arm 52' together with connections 15' and 54'. The co-axial pulleys 50, 50' rotate in opposite directions and are shown carried by a shaft 51 from a mounting plate 53 carried by the frame 3. The arms 52, 52' are guided by a correspondingly channelled guide block 55 e.g. of lubricant treated nylon for anti-friction action and carried by the underside of the upper cross member 30.

As already indicated and in accordance with a further feature of the grab, provision is made at 2 for locating and steadying the load on the pallet assembly and is shown consisting of a pair of opposed plates 24 or similar members each adjacent a corresponding pair of pallet legs 12 and interiorly disposed in relation to the latter. Each plate 24 is carried by a pair of legs 22 depending from the frame 3 and lying between the adjacent pair of pallet legs 12. Each pair of plate legs 22 depend in a suitably spaced apart arrangement from an upper cross member 23 and each leg 22 has an arm 21 slidable in a channel section guide 32 alongside an adjacent pallet leg arm guide member 31.

The cross members 23 are connected by a hydraulic ram 20 shown positioned immediately under the ram 10 for imparting movement apart or together of the plates 24. Such movement of the plates 24 is of considerably less extent than that of the pallet legs 12 and is sufficient for the plates 24 to bear against the load L in order to hold it firmly as the pallet half portions 40 are withdrawn from under the load. In view of the small extent of movement of the plate legs 22 equalisation and limitation of their movement apart is shown effected by pin and slot lost motion mechanism 6 in which a slotted arm 60 anchored on the leg arm 21 engages a pin 61 on the guide member 32 (or vice versa) such that on one pair of plate legs 22 reaching its full extent of outward movement it is checked by the pin and slot connection 6 so as to cause the other pair of plate legs 22 to move fully outward as the ram 20 extends. Retraction of the plates 24 against the load L is self adapting depending on the position and nature of the load. The short stroke ram 20 is shown connected to the cross members 23 by box section extensions 25 from the latter.

The guides 31, 32 are provided with internal anti-friction inserts or strips 310, 320 for bearing contact with the respective arms 11, 21, which inserts may be again of lubricant treated nylon or other suitable material.

The cross member 30 provides central mounting for a suspension point shown provided in a known manner by a hydraulic rotator 7 for turning the complete grab about a vertical axis in aligning it with a loaded pallet and positioning the latter for depositing on the ground or elsewhere. Again in a known manner the rotator provides hydraulic fluid supply and return connection 70, 71 from a crane or hoist to a valve 8 for controlling hydraulic operation of the rams 10 and 20.

A number of pallet assemblies 4 are provided separate from the grab with the half portions 40 held in locating pin and socket engagement 42, 43 by catches 45 and a load L e.g. of piled sacks, is placed on each pallet assembly 4 either directly or usually on a simple base board or the like which is placed on the pallet assembly 4. The loaded pallets 4 are placed on a vehicle for delivery such as a flat platform motor truck or otherwise positioned as required. Each pallet 4 may be raised for this purpose by a grab according to this invention or by a fork lift truck, the fork prongs of which are able to engage guide channels 44 one in the underside of each pallet half portion 40.

When it is required to unload the load L the grab is rotated as required and lowered over the pallet assembly 4, e.g. by the vehicle or other hoist and with the legs 12 slightly apart until the recesses 164 are able to engage under the pallet hooks 41 on full retraction of the legs 12 by the ram 10. The loaded pallet 4 is lifted off the vehicle by the grab and lowered to the ground or placed on another surface such as at a building site.

Figure 10:
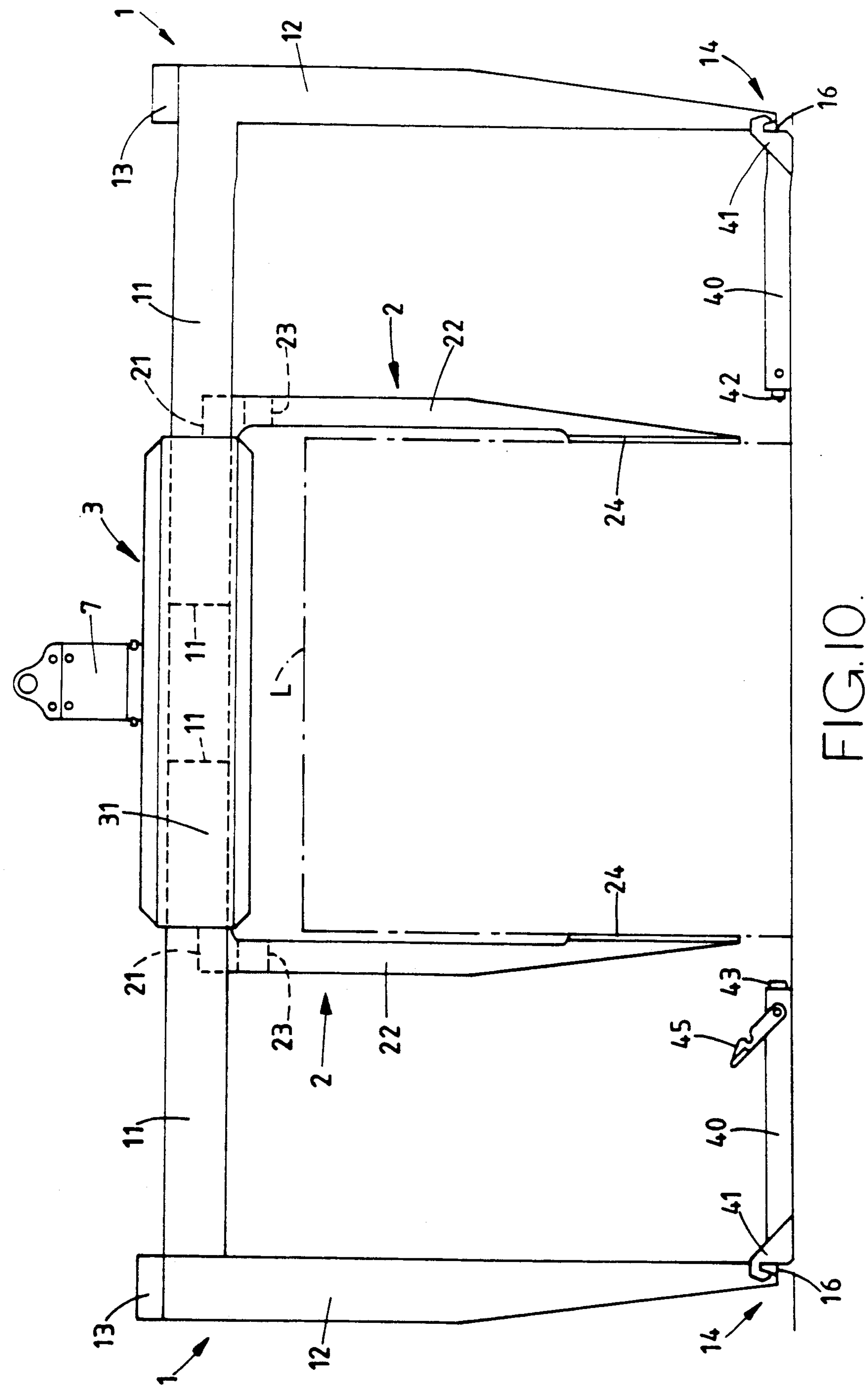
FIG. 10 is a front elevation in an extended condition.

After prior release of the pallet catches 45 (e.g. when the pallet 4 is still on the vehicle) the ram 10 is then operated to fully extend the pairs of legs 12 laterally so that each pallet half portion 40 is withdrawn from underneath the load L leaving the latter standing on the ground as shown in FIG. 10. Prior to withdrawal the ram 20 is operated to close the plates 24 to hold and steady the load L during withdrawal. On full withdrawal of the pallet half portion 40 the ram 20 is operated to release the plates 24 from the load L by their movement apart. A sequence of hydraulic operation of the rams 10, 20 is later described. When all the pallet assemblies 4 have been unloaded in this way their halves 40 can be brought together by retraction of the legs 12 and secured by the catches 45 and then replaced on the vehicle by the grab for immediate return and re-use. Thus normally there is no need for the pallet assemblies 4 to remain on a building site or the like where they might otherwise suffer damage and deterioration or be lost.

Single supply and return of hydraulic fluid to the valve 8 via the rotator 7 suits current hydraulic arrangements of cranes or hoists so that single control lever operation of the grab legs 12, 22 can be conveniently effected from the hoist along with separate controls of the slewing and luffing of the hoist jib and of the rotator 7. For this purpose the valve 8 automatically effects sequential changeover operation of the rams 10 and 20 with a pressure build up or relief action such that on full retraction of the ram 10 to close the legs 12 towards one another pressure build up or relief effects changeover of the valve 8 to cause the ram 20 to open the plates 24 and vice versa, the arrangement permitting some initial extension/retraction operation of the ram 10 without causing operation of the ram 20.

A hydraulic circuit diagram is shown in FIG. 6 and a typical sequence of hydraulic operation is as follows:

With the legs 12 slightly opened from the retracted position the grab is offered over the loaded pallet 4 and the legs 12 are then fully closed to engage the pallet, the plates 24 remaining open to avoid fouling the load L. After lifting, traversing and putting down the pallet 4 and as the ram 10 starts to extend to withdraw the pallet halves 40, resulting operation of the valve 8 causes the ram 20 to close the plates 24 against the load L to hold and steady it as the pallet halves 40 are withdrawn. After full withdrawal the hoist control lever is momentarily operated as for closure of the legs 12 whereupon the valve 8 is conditioned to cause the plates 24 to be opened by the ram 20 and thus release the load L. The grab with legs 12 and pallet halves 40 fully apart is lifted clear and then put down to close the pallet halves 40 together, the plates 24 remaining open. Opening of the grab to release the legs 12 from the pallet 4 causes free closure of the plates 24 but which are opened apart again when the legs 12 are fully retracted ready for engagement with a further load.

However if desired independent control of the rams 10, 20 may be employed.

The pallet engaging action of the grab and the arrangement of the fork lift guide channels 44, facilitate the handling of loads L onto and from a vehicle. Thus the loaded pallets 4 can be fork lifted sideways onto a vehicle in two rows with a central gap between the rows which enables the grab legs 12 to gain access to both sides of each load.

For safety in transit this enable the loads L in each row to abut or be close to one another. If desired load location means may be provided on the vehicle.

In some cases the grab may be used to load a pallet assembly 4 by retracting the pairs of legs 12 from the extended condition in order to thrust the pallet half portions 40 under the load together with any steadying location of the latter by the plates 24.

As shown the pallet half portions 40 may be of fabricated construction e.g. from steel plate or cast e.g. in aluminium or produced as a plastic moulding such as an injection moulding. If desired and to facilitate withdrawal the upper load bearing surfaces of the pallet halves 40 may be mutually inclined downwardly towards their abutting edges.

Figure 11:
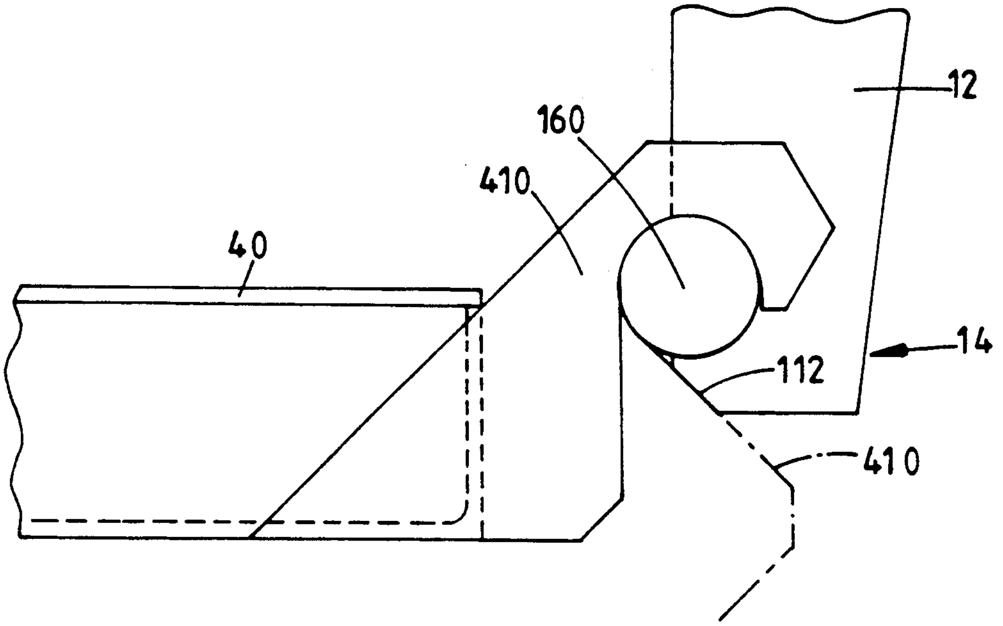
FIGS. 11 and 12 are detail elevations each showing an alternative pallet hook connection arrangement.
Figure 12:
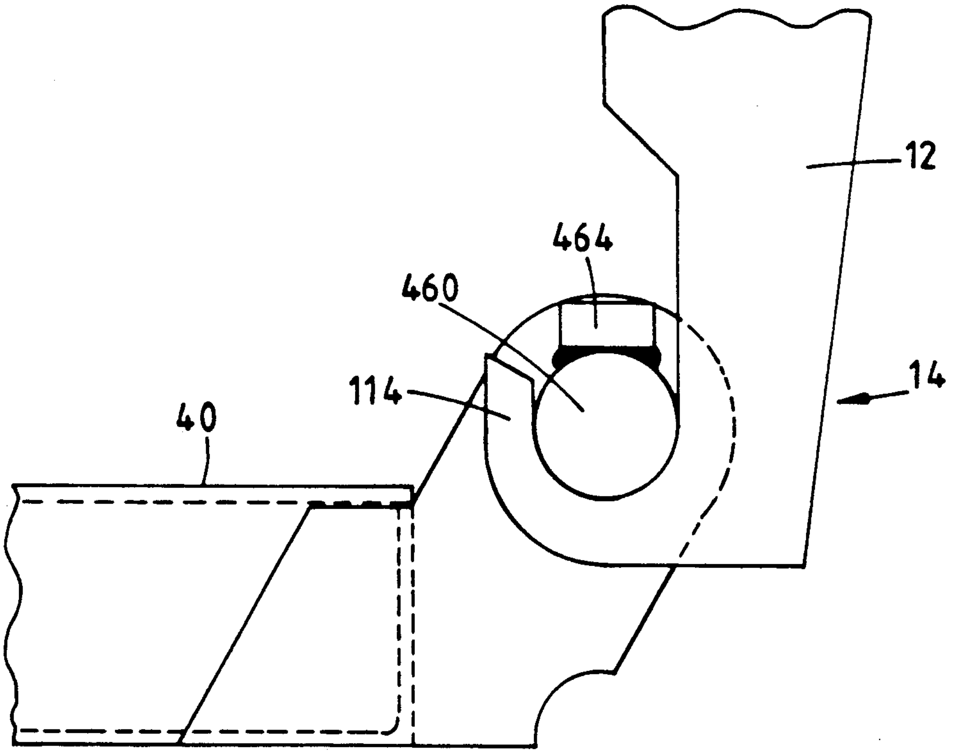

Alternative hook engagement arrangements 14 of a leg 12 with a pallet half portion 40 are shown in FIGS. 11 and 12 where in FIG. 11 a round section cross member 160 on the lower ends of each pair of legs 12 engages a pallet hook bracket 410 of corresponding form. This permits rotation of the pallet half portion 40 about the hook engagement for cantilever downward inclination of the half portion 40 which is shown limited by abutment of the hook bracket 410 with the foot of the leg 12 at 112.

In FIG. 12 a round form hook 114 is provided at the foot of the leg 12 and engages a round section member 460 on the pallet half portion and which may be provided by a strengthening bar running the length of the latter especially where the pallet portion 40 is of moulded construction. Here again the half portion 40 is able to rotate relative to each leg 12 for downward inclination and which is shown limited by a stop 464 welded on the member 460 and which abuts the hook 114.

Figure 13:
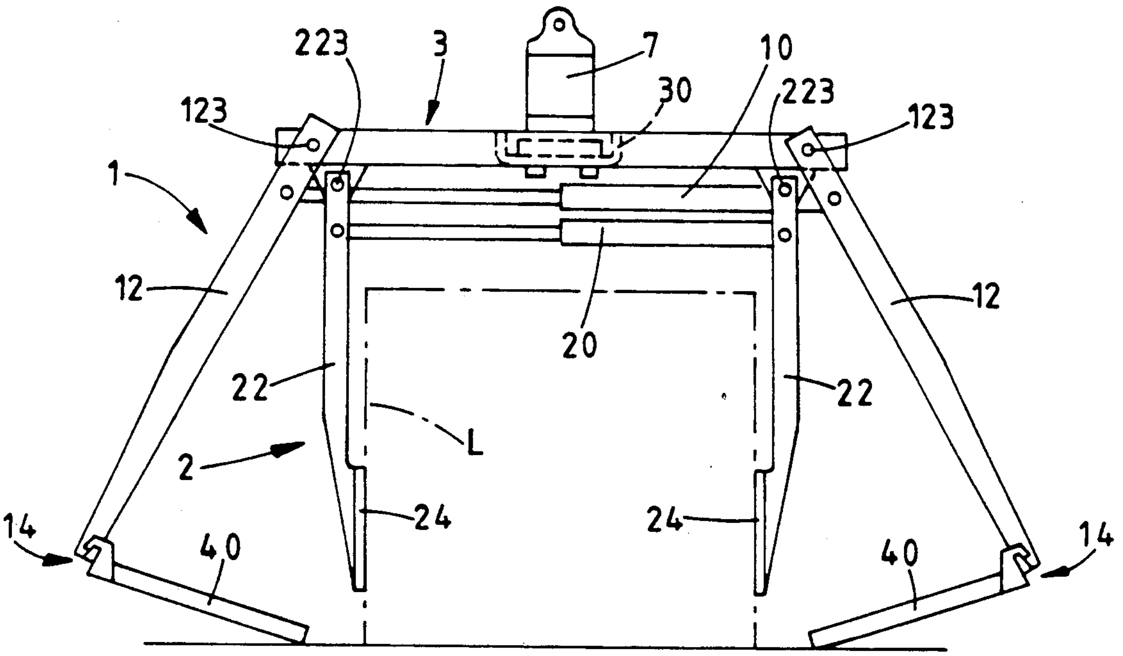
FIG. 13 is a diagrammatic front elevation showing a modified arrangement of the apparatus.

The pairs of legs 12, 22 may be braced or part of, or in effect provided by, framework construction whilst various structural and arrangement modifications or developments may be made within the scope of the invention as herein defined. Thus as indicated in FIG. 13 the opposed depending limbs or legs 12 may be pivotally carried at 123 by a suitable frame 3 for appropriate angular extension movement or retraction together by ram operation at 10 and whereby the pallet half portions 40 assume a suitable angle for withdrawal from under the load, which angle is permitted by some extent of pivotal movement at the hook engagement 14.

As also shown and in a similar manner the legs 22 may be pivotally carried at 223 by the frame 3 for operation by the ram 20 in obtaining required relative movement of the plates 24 in releasably steadying the load L on the pallet 4 during withdrawal of the pallet half portions 40.

The catches 45 may be arranged for automatic release on hook engagement of the legs 12 with the pallet half portions 40.

Whereas hydraulic ram operation of the legs 12, 22 is preferred in practice, other power operated means may be employed such as rack and pinion and/or screw mechanism driven by a hydraulic or other suitable motor or motors.

I claim:

1. Load handling apparatus comprising:

a) a suspension structure adapted to be raised or lowered by a hoisting means for raising or lowering said suspension structure;

b) opposed limbs depending from said suspension structure and movably carried thereby, said limbs thus having lower ends;

c) power operation means carried by the suspension structure for effecting lateral extension apart of the opposed limbs or their retraction towards one another;

d) a split pallet assembly providing two substantially rectangular load bearing portions adapted to be detachably engaged by the lower ends of the opposed depending limbs when the latter are retracted towards one another in order to enable lifting and lowering of said pallet portions when closed together to take place in a load supporting condition with the suspension structure, lateral extension of the opposed limbs apart from one another effecting withdrawal of the pallet portions apart from under a load thereon in order to gravitationally deposit the load and whereby the withdrawn and separated pallet portions can be subsequently lifted and moved clear of the deposited load.

2. Load handling apparatus according to claim 1 wherein locating means is provided which also depends from the suspension structure and is movably carried thereby and is arranged to be operated by power operation means carried by the suspension structure for movement against a load on the pallet assembly to hold the load thereon during withdrawal of the pallet portions apart from under the load, said locating means being further operable by said power operation means to release the load on its deposit from the withdrawn pallet portions.

3. Load handling apparatus according to claim 2 wherein control means is provided for controlling the power operation means carried by the suspension structure for obtaining operation of the opposed pallet engaging limbs and the locating means in conjunction with one another in handling the pallet assembly and in holding the load during withdrawal of the pallet portions apart from under the load.

4. Load handling apparatus according to claim 3 wherein the power operation means comprises fluid pressure operated ram means and the control means comprises valve means for effecting a sequential changeover operation of the ram means in obtaining a required operating procedure of the opposed pallet engaging limbs and the load locating means.

5. Load handling apparatus according to claim 2 wherein the load locating means is slidably carried by the suspension structure for operation against a load on the pallet assembly and release therefrom.

6. Load handling apparatus according to claim 2 wherein the load locating means is pivotally carried by the suspension structure for operation against a load on the pallet assembly and release therefrom.

7. Load handling apparatus according to claim 1 wherein the opposed pallet engaging limbs are adapted to have a detachable hook engagement with the pallet portions.

8. Load handling apparatus according to claim 1 wherein the detachable engagement of the opposed limbs with the pallet portions is such that on the latter being withdrawn apart from under a load thereon and raised with the suspension structure they assume a limited downwardly inclined position to facilitate the withdrawal.

9. Load handling apparatus according to claim 1 wherein the opposed pallet engaging limbs are slidably carried by the suspension structure for extension and retraction movements.

10. Load handling apparatus according to claim 1 wherein means is provided for obtaining equalized extent of extension and retraction operation of the opposed pallet engaging limbs on the suspension structure.

11. Load handling apparatus according to claim 1 wherein the pallet portions when closed together are arranged to have a locating engagement at their adjacent inner edges.

12. Load handling apparatus according to claim 1 wherein the pallet portions when closed together are arranged to have a releasable connection which is arranged to be released prior to withdrawal operation of the pallet portions apart by the opposed pallet engaging limbs.

13. Load handling apparatus according to claim 1 wherein the opposed pallet engaging limbs are pivotally carried by the suspension structure for extension and retraction movements.

14. Load handling apparatus according to claim 1 wherein the pallet portions when closed together are arranged to have a locating pin and socket engagement at their adjacent inner edges.

* * * * *